United States Patent
Blyme et al.

(10) Patent No.: US 10,900,248 B2
(45) Date of Patent: Jan. 26, 2021

(54) METHOD FOR PROTECTING A BUILDING AGAINST FLOODING

(71) Applicant: DOMODOM HOLDING APS, Horsholm (DK)

(72) Inventors: Peter Johannes Hindhede Blyme, Horsholm (DK); Susanne Toftgaard Nielsen, Horsholm (DK); Daniel Mortensen, Ishoj (DK); Peter Sommer-Larsen, Taastrup (DK); Michael Lei, Randers NV (DK); Jorn Bech, Skanderborg (DK)

(73) Assignee: DOMODOM HOLDING APS, Horsholm (DK)

( * ) Notice: Subject to any disclaimer, the term of this patent is extended or adjusted under 35 U.S.C. 154(b) by 0 days.

(21) Appl. No.: 16/494,855

(22) PCT Filed: Feb. 8, 2018

(86) PCT No.: PCT/EP2018/053150
§ 371 (c)(1),
(2) Date: Sep. 17, 2019

(87) PCT Pub. No.: WO2018/166724
PCT Pub. Date: Sep. 20, 2018

(65) Prior Publication Data
US 2020/0123800 A1 Apr. 23, 2020

(30) Foreign Application Priority Data
Mar. 17, 2017 (DK) .................................. 2017 70188

(51) Int. Cl.
*E04H 9/14* (2006.01)
*E02B 3/10* (2006.01)

(52) U.S. Cl.
CPC ............. *E04H 9/145* (2013.01); *E02B 3/104* (2013.01)

(58) Field of Classification Search
CPC ... E04H 9/145; E02B 3/104; E06B 2009/007; E06B 9/00
See application file for complete search history.

(56) References Cited

U.S. PATENT DOCUMENTS 4,488,386 A * 12/1984 Thompson .............. E04G 21/24
52/169.1
6,029,405 A * 2/2000 Wood ........................ E04H 3/14
52/2.23
(Continued)

FOREIGN PATENT DOCUMENTS

| CN | 201857792 U | 6/2011 |
|---|---|---|
| DE | 102006039194 A1 | 2/2008 |

(Continued)

OTHER PUBLICATIONS

Danish Search Report from DK Application No. PA 201770188, Sep. 12, 2017.
(Continued)

*Primary Examiner* — Carib A Oquendo
(74) *Attorney, Agent, or Firm* — Workman Nydegger (57) ABSTRACT

A method for protecting a building against flooding by use of a membrane connected along a first side edge to a float, and comprises the steps of arranging the membrane in a packed configuration at a first distance from the building, and fixing the membrane to the ground at a start location along a second side edge, allowing water to unpack the membrane and move the float toward the building to arrange a first portion of the membrane with a lower surface against ground in an area between the start location and the building, allowing water to raise the float a second distance along an outer surface of the building while further unpacking the
(Continued)

membrane to arrange a second portion of the membrane with the lower surface against the building. The first portion forms a retention portion which is retained on the ground by water on an opposite upper surface.

18 Claims, 8 Drawing Sheets

(56) References Cited

U.S. PATENT DOCUMENTS

| | | | | |
|---|---|---|---|---|
| 6,216,399 | B1* | 4/2001 | Belarbi | E02B 3/104 |
| | | | | 52/169.14 |
| 2013/0302092 | A1* | 11/2013 | Ortiz | E06B 9/00 |
| | | | | 405/36 |

FOREIGN PATENT DOCUMENTS

| | | |
|---|---|---|
| DE | 102007037476 A1 | 4/2009 |
| DE | 102014006783 A1 | 6/2015 |
| DE | 102014001431 A1 | 8/2015 |
| EP | 0861360 B1 | 9/2002 |
| EP | 3061870 A1 | 8/2016 |
| FR | 2531475 A1 | 2/1984 |
| GB | 2374108 A | 10/2002 |
| GB | 2378726 A | 2/2003 |
| GB | 2399127 A | 9/2004 |
| GB | 2435664 A | 9/2007 |
| GB | 2438856 A | 12/2007 |
| GB | 2450875 A | 1/2009 |
| WO | 9718369 A1 | 5/1997 |

OTHER PUBLICATIONS

International Search Report from PCT Application No. PCT/EP2018/053150, May 3, 2018.
International Preliminary Report on Patentability from PCT Application No. PCT/EP2018/053150, Jun. 7, 2019.

* cited by examiner

METHOD FOR PROTECTING A BUILDING AGAINST FLOODING

FIELD OF THE INVENTION

The present invention relates to method for protecting a building against flooding by use of a membrane, to a flooding protection installation configured to protect a building, and to a flooding protective device.

BACKGROUND OF THE INVENTION

Traditionally, flooding is prevented by the construction of embankments and similar barriers along rivers, lakes, and the sea. However, during heavy rain the embankments may be ruined or the water may rise above the embankments whereby buildings may be filled with water and thus damaged. To protect the buildings onsite, sandbags may be used to delay raising water getting into the buildings. Different membranes configured to be pulled up along an outer surface of a building also exist. Often, they require the building owner to be at home. Furthermore, the membrane may be damaged when pulled up along the outer surface due to the frictional forces between the building and the membrane.

DESCRIPTION OF THE INVENTION

It is an object of embodiments of the invention to provide an improved method for protecting a building against flooding by use of a membrane, to provide an improved flooding protection installation configured to protect a building, and to provide an improved flooding protective device.

It is a further object of embodiments of the invention to provide a flooding protection installation which utilise the rising water to adjust the shape of the membrane to the building which should be protected.

It is an even further object of embodiments of the invention to provide a method for protection and a flooding protection installation which delay the water flowing toward the building under ground level.

According to a first aspect, the invention provides a method for protecting a building against flooding by use of a membrane connected along a first side edge to a float, the method comprising the steps of arranging the membrane in a packed configuration at a first distance from the building, and fixing the membrane to the ground at a start location along a second side edge, allowing water to unpack the membrane and to move the float toward the building to thereby arrange a first portion of the membrane with a lower surface against ground in an area between the start location and the building, allowing water to raise the float a second distance along an outer surface of the building while further unpacking the membrane to thereby arrange a second portion of the membrane with the lower surface against the building, wherein the first portion forms a retention portion being retained on the ground by water on an opposite upper surface.

Thus, the invention provides in a first aspect, a method for protecting a building, where a membrane is arranged at a first distance from the building. The membrane may be configured to adapt its shape to the shape of the building by utilisation of rising water and without necessarily using power driven means.

Furthermore, the invention may provide the ability of protecting a building without attaching the membrane to the building. Consequently, the invention may eliminate or at least considerably reduce the risk of buoyancy problems, as a membrane attached to the building may create buoyancy problems.

The membrane may thus be arranged to protect the building by allowing water to unpack the membrane and to move the float toward the building. When unpacking the membrane, a first portion of the membrane can be arranged with a lower surface against ground in an area between the start location and the building. When water unpacks the membrane, water is located on an opposite upper surface of the membrane, whereby the first portion forms a retention portion which is retained on the ground by the water on the opposite upper surface. Consequently, the first distance may provide the advantage of retaining the membrane on ground and the advantage of avoiding buoyancy problems, as water located on the upper surface of the membrane will avoid lifting of the membrane.

Water located on top of the membrane at the retention portion, i.e. the first portion located on ground may thus keep the membrane in place by retaining the membrane at ground.

The membrane forms a first side edge and an opposite second side edge. The membrane is connected along the first side edge to a float. In one embodiment, the float extends continuously along the first side edge, whereas the float in an alternative embodiment extends discontinuously along the first side edge. If arranged discontinuously along the first side edge, it should be understood that the distance between two neighbouring parts of the float may vary. However, the different float parts which constitute the float may also be equidistantly spaced along the first side edge. If extending continuously, the float may be attached along the full length hereof or attached at a plurality of attachments points along the length of the float.

To achieve the best protection, the membrane should be arranged before flooding occurs. Thus, the membrane is arranged in a packed configuration at a first distance from the building which should be protected against flooding. The first distance may vary based on type of ground, the size of the building, the layout of the surroundings, such as trees, plant beds, light shafts, etc.

In the context of the present invention, the term "a packed configuration" should be understood as a configuration in which the membrane is rolled, folded, or otherwise arranged whereby the size of the membrane is smaller than if it is arranged in an unpacked configuration flat on the ground.

The membrane is a substantially waterproof membrane, such as a membrane suitable for use in roofs. The membrane may be a rigid plastic membrane, e.g. made form High-density polyethylene (HDPE). The membrane may have a thickness in the range of 100-500 micrometres. As an example, a Tyvek® membrane from Dupont may be used.

The first side edge may be arranged substantially parallel to the outer surface of the building to be protected.

In order to be able to protect the building from flooding from all sides of the building, the membrane may be arranged circumferential around the building. The membrane may thus form a closed ring around the building. It should be understood, that the ring may be of an arbitrary shape. In a preferred embodiment, the membrane may be arranged circumferentially around the building so that the first side edge is arranged substantially parallel to each of the outer side surfaces of the building. However, especially at smaller indentations in the outer surface of the building, the first side edge of the membrane may often not follow the shape of the building.

As the membrane may be arranged circumferentially around the building at a first distance from the building, the circumference of the membrane may adapt to the smaller circumference of the building when water unpacks the membrane and moves the float toward the building. Subsequently, the float may be moved along the outer surface of the building while unpacking the membrane further.

The membrane may be made from a plurality of membrane sheets being joined along edges being transverse to the first side edge. The membrane sheet may as an example be adhesively joined. However, other types of joints may also be applicable, such as stitched or welded joints. It may be an advantage, if the joints are substantially water tight, e.g. by the provision of a water tight seal, as this may hinder water on the retention portion to leak to the ground below the membrane.

The method comprises a step of fixing the membrane to the ground at a start location along a second side edge of the membrane. The second side edge may be substantially parallel to the first side edge, whereby the float may be arranged at and opposite end of the membrane relative to the fixing position. In the context of the present invention, the term "fixed to the ground at a start location" should be understood as covering both embodiments where the membrane is fixed directly to the ground and embodiments where the membrane is fixed indirectly to the ground, e.g. by fixing the membrane to an encapsulation which is fixed to the ground. In one embodiment, fixing the membrane to ground may be achieved by the weight of the membrane itself.

In the context of the present invention, the term "along a second side edge" should be understood at covering not only embodiments where the membrane is fixed at a second side edge, but also embodiments where the membrane is fixed along a second side edge at a distance from the edge.

When unpacking the membrane, the distance between the first side edge and the second side edge will be increased. Thus, unpacking occurs in a direction from the start location at which the membrane is fixed along the second side edge toward the building; i.e. in an unpacking direction from the start location toward the building.

The start location is located at a distance from the building, which distance corresponds to the first distance. The first distance is typically in the range of 0.2-3.5 meters, such as in the range of 0.5-2.0 meters from the outer surface of the building. It should be understood, that the first distance may vary along the outer surface(s) of the building whereby the first distance as an example at one location may be 0.5 meters and at another location may be 1.5 meters.

In the packed configuration, the membrane may have size, such as a width parallel to the first distance. In embodiments where the membrane is packed by rolling whereby the outer shape is substantially circular, the width may correspond to the diameter of the rolled membrane. If the membrane is folded in the packed configuration, the width may correspond to the size of a fold.

The first distance may be at least 1.5 times the width. By providing the first distance of a size of at least 1.5 times the width of the membrane in the packed configuration, it may be achieved that a sufficient part of the membrane is arranged with a lower surface against ground in an area between the start location and the building, with water located on the opposite upper surface of the membrane to thereby ensure that the first portion forms a retention portion being retained on the ground by the water on the opposite upper surface.

In one embodiment, the membrane may be fixed continuously along the second side edge, whereas the membrane in an alternative embodiment may be discontinuously fixed along the second side edge. If fixed discontinuously, it should be understood that the distance between two neighbouring fixing points may vary. However, the different fixing points may also be equidistantly spaced along the second side edge.

The number of fixing points and/or type of fixing may depend on the type of ground, the size of the membrane, and the type of fixation used. As an example, earth rods may be used. Additionally or alternatively, the membrane may be fixed by arranging at least a part of the second side edge below ground level, or by arranging soil, stones, or other elements at the second side edge. Other types of fixing may also be used, e.g. by the application of an encapsulation.

The membrane may be arranged on the ground at the start location or may be arranged at least partly below ground level at the start location. By arranging the membrane at least partly below ground level, the membrane may at least partly merge into the site.

The method comprises a step of allowing water to unpack the membrane and to move the float toward the building to thereby arrange a first portion of the membrane with a lower surface against ground in an area between the start location and the building.

When water rises and flows toward the building, the water may move the float toward the building. As the membrane is connected to the float along a first side edge, the membrane may consequently be moved toward the building while at the same time being fixed to the ground at the start location. As a result, the membrane may be unpacked and thus cover a larger area than in the packed configuration, and a first portion of the membrane may be arranged with a lower surface against ground in an area between the start location and the building, thereby providing a retention portion being retained by water.

Furthermore, water is allowed to raise the float a second distance along an outer surface of the building while further unpacking the membrane to thereby arrange a second portion of the membrane with the lower surface against the building.

Consequently, as water rises, the float will be moved upward along the outer surface of the building whereby the membrane can be arranged with a second portion of the membrane against the building to thereby protect the building from flooding. Thus, a building may be protected by the use of the method without the utilisation of electricity thereby providing a reliable method which efficiently protects the building even if electricity supply is interrupted e.g. due to bad weather conditions.

Even though the membrane may be arranged to protect the building and may be unpacked substantially automatically, it should be understood that the membrane in one embodiment may also be unpacked manually, if desired.

It should be understood that the float may be moved upward at one distance at one side of a building and at another distance at another side of the building. As an example, the ground level may at one side of the building be lower than at another side of the building. If the membrane is arranged circumferentially around the building, a first portion of the membrane is arranged with a lower surface against ground in an area between the start location and the building at both sides of the building. As the rising water may determine the height to which the float is raised, a second distance where a second portion of the membrane is arranged with the lower surface against the building may consequently be smaller at the one side of the building than at another side of the building.

It should further be understood, that due to differences in rising water level, the membrane may at one side be arranged with a first portion against ground and a second portion against the building, whereas the membrane at another side of the building may only be arranged with a first portion against ground. The first portion may extend from the start location to the building or from the start location toward the building without reaching the building.

By arranging the start location at a first distance from the building, it may be achieved that the membrane may adapt to the shape of the building during unpacking of the membrane. Furthermore, it may be achieved, that light shafts, ventilation ducts, etc. are also covered by the membrane. The first distance may further provide the advantage, that buoyancy problems can be avoided, as water located on the upper surface of the membrane; i.e. at the retention portion, will avoid lifting of the membrane and the building from ground. Furthermore, if the membrane was to be attached to the building this would create buoyancy problems as well. Buoyance problems relating hereto may further be avoided by arranging the start location at a first distance from the building.

When water raises the float a second distance along the outer surface of the building, this second distance will be determined by the amount of water. In one embodiment, the size of the membrane may provide a maximum second distance being at least ¾ of the first distance, such as identical to the first distance, such a 1.5 or even more the first distance. It should however be understood, that the first distance may depend on type of ground, the size of the building, the layout of the surroundings, such as trees, plant beds, light shafts, etc. Additionally, the second distance may depend on the type and size of the building, the construction of the building, historical weather data, etc.

If water rises above a critical value, the pressure from the water toward the outer surface of the building may exceed as critical value which the building cannot withstand. Thus, the second distance may be below said critical value. Alternatively, the building may be strengthened to increase the critical value, and thus allow for a larger second distance.

In one embodiment, the membrane may be rolled about the float. Thus, the step of allowing the water to unpack the membrane and move the float toward the building may comprise a step of unrolling the membrane.

By rolling the membrane about the float whereby the packed configuration is at least partly a rolled configuration, damage of the membrane can be avoided or at least considerably reduced as the frictional forces between the building and the membrane during unpacking are avoided or at least considerably reduced, as the membrane is not pulled up along the outer surface of the building.

The float may comprise one or more tubes, such as hollow tubes, a plurality of ring-shaped element, a plurality of balls, such as hollow balls. Other elements may also be applicable. In the context of the present invention, the term "float" should be understood as an element or a plurality of elements which can float on water without sinking.

As an example, the float may comprise at least one tube e.g. made of PET. Other materials may however also be used. The diameter may as an example be in the range of 90-210 mm. It should however be understood, that the diameter may be smaller or larger dependent on the length of the float and/or the size of the membrane, the size of the building, the shape of the building, including e.g. terraces, light shafts, external stairs, etc.

The float may form an internal cavity or plurality of cavities. In one embodiment, a continuous cavity is formed along the first side edge, thus forming a cavity extending circumferentially around the building.

In one embodiment, the float may comprise rigid sections connected by bendable sections. By rigid sections should be understood sections which are less flexible that the bendable sections. As an example, the rigid sections may be formed by plastic tubes, such as PET tubes, whereas the bendable sections may be made of one or more flex hoses. In an alternative embodiment, the rigid sections may be formed by balls/spheres, whereas the bendable sections may be made of rope, cables, wires, etc. Other combinations may also be used.

In one embodiment, the bendable sections may be arranged in the area of corner sections of the building which should be protected. This may enable arrangement of the membrane circumferential around the building when the membrane is unpacked and its shape is adapted to the shape of the building. It should be understood, that the length of the float at corner sections of the membrane may have a length being longer than the membrane at the first side edge at with it is connected to the float to thereby ensure that the length of the float is sufficiently long to be arranged at a first distance from the from the building at a corner section of a building.

By fixing the membrane at a start location at a first distance from the building, it may be achieved, that rising water flowing toward the building below the membrane is avoided or at least delayed. To achieve this, the distance may be varied depend on the type of ground. As an example, the distance may be larger if the ground consists of sand compared to a ground consisting of clay.

In one embodiment, water is allowed to float substantially only on an upper surface of the membrane, the upper surface being opposite to the lower surface of the membrane. This may as an example be achieved by arranging at least a part of the second side edge below ground level.

According to a second aspect, the invention provides a flooding protection installation configured to protect a building, the installation comprising a membrane connected along a first side edge to a float, the membrane being configured to be arranged in a packed configuration at a first distance from the building, and being configured to be fixed to the ground at a start location along a second side edge, wherein the membrane is configured to be unpacked and the float is configured to be moved toward the building by water whereby a first portion of the membrane is configured to be arranged with a lower surface against ground in an area between the start location and the building, and wherein the float is configured to be raised a second distance along an outer surface of the building and a second portion of the membrane is configured to be arranged with the lower surface against the building, wherein the first portion forms a retention portion being retained on the ground by water on an opposite upper surface.

It should be understood, that a skilled person would readily recognise that any feature described in combination with the first aspect of the invention could also be combined with the second aspect of the invention, and vice versa.

The flooding protection installation according to the second aspect of the invention is very suitable for performing the method steps according to the first aspect of the invention. The remarks set forth above in relation to the method are therefore equally applicable in relation to the flooding protection installation.

The flooding protection installation may be arranged without being attached to the building which should be protected, whereby the flooding protection installation may eliminate or at least considerably reduce the risk of buoyancy problems, as a flooding protection installation attached to the building may create buoyancy problems.

In order to be able to protect the building from flooding from all sides of the building, the membrane may be arranged circumferential around the building. The membrane may thus form a closed ring around be building. The ring may be of any arbitrary shape. By arranging the membrane at a first distance from the building to be protected, the shape and the size of the membrane may be adapted to the smaller size and shape of the building.

The flooding protection installation may further comprise an encapsulation with space for the membrane and the float. The membrane may be arranged in the packed configuration in the encapsulation. The encapsulation may be arranged on the ground at the start location at a first distance from the building. Alternatively, the encapsulation may be arranged at least partly below ground level. In one embodiment, the encapsulation may be arranged with an upper side surface substantially at ground level thereby merging into the surroundings.

The encapsulation may have an opening and a closure movable relative to the opening between an open and closed configuration. The closure may cover the opening and thereby close the encapsulation. In the open configuration, the membrane may be arranged in the encapsulation and removed from the encapsulation.

To facilitate unpacking of the membrane, the encapsulation may be arranged so that the opening with the closure is facing upwardly.

The encapsulation may as an example be made of PVC, PE, concrete, or other materials which can at least for a longer period withstand wear due to contact with ground and/or wear due to changing weather conditions.

The membrane may be attached to an inner surface of the encapsulation, e.g. along the second side edge. This may e.g. be achieved by use of an adhesive, by use of tape, or by a Snap fit locking where a part of the membrane engages a part of the encapsulation.

The encapsulation itself may be kept in place by fixing it to the ground by use of earth rods or other fixation elements. It should however be understood that the fixing to ground may be achieved by the weight of the membrane and the encapsulation.

The flooding protection installation may further comprise a release structure configured to release the membrane upon detection of water to thereby enable unpacking. The release structure may comprise a water detection element which may provide automatic release. In an alternative embodiment, detecting of water is done manually.

In one embodiment, the release structure may comprise a tube and pressure means. Upon detection of water, the pressure means may inflate the tube whereby the membrane may be arranged in a position which allows water to unpack the membrane and to move the float toward the building. As an example, the membrane may be lifted out of the encapsulation in the packed configuration, and water may subsequently unpack the membrane by moving the float toward the building.

I.e. the release structure may further be configured to lift the membrane and the float out of the encapsulation upon detection of water to facilitate unpacking of the membrane. It should be understood that if the flooding protection installation does not include an encapsulation, the release structure may be configured to lift the membrane and the float free of the ground, such as out of a groove in the ground.

To facilitate positioning of the membrane with the lower surface against ground and against the building, the membrane may comprise at least one corner section configured to be arranged against a corner of the building by the water. By "configured to be arranged against a corner" is herein meant that the membrane at the corner sections has a length and a width being sufficient to cover both the ground between the start location and the building and to cover at least a part of the building along an outer surface hereof. The length defines the size of the membrane along the first and second side edges, and the width defines the size of the membrane from the first side edge to the second side edge.

To further facilitate positioning, the membrane may comprise a corner section corresponding to each of the corners of the building which should be protected against flooding.

To facilitate adaptation of the membrane to the shape of the building at corners of the building, the at least one corner section may be formed by folding at least a part of the membrane. Thus, the corner section may comprise a membrane section being substantially rectangular and comprising a plurality of folds to thereby form a substantially triangular shape when the membrane is in the unpacked configuration, where the folds extend in the unpacking direction. It should be understood, that the substantial rectangular membrane section may initially be folded and subsequently arranged to form a triangular shape. This may be achieved by folding the membrane section with parallel folds, e.g. with a fold at each 5 centimetres, 8 centimetres, 10 centimetres, or more. After folding the membrane section, it may be arranged in a triangular shape, e.g. by contracting the membrane section along the first side edge, whereby the distance between two neighbouring folds increases from the first side edge to the second side edge along which the membrane may subsequently be fixed to the ground. The triangular shape may due the folds form a fan-like shape.

Thus, in one embodiment, at least one corner section may be substantially triangular when unpacked. When providing substantially triangular corner sections by folding the membrane, the folds are not parallel whereby the distance between two neighbouring folds increases from one side edge to the opposite side edge. At an outer corner, the distance between two neighbouring folds may increase from the first side edge to the second side edge. At an inner corner of a building, the distance between two neighbouring folds may increase from second side edge to the first side edge. It should be understood, that an outer corner is defined as an outwardly protruding edge of the building.

Thus, the corner sections may be formed of substantially rectangular membrane sections comprising a plurality of folds to form a substantially triangular shape when the membrane is in the unpacked configuration.

It should be understood, that a corner section may alternatively comprise a membrane section being substantially rectangular and being contracted at one of the first side edge and the second side edge to thereby form a substantially triangular shape. To fit an outer corner, the membrane may be contracted at the first side edge, and to fit an inner corner the membrane may be contracted at the second side edge.

The corner section may have a length of one of the first side edge and the second side edge being at least twice the length of the other one of the first side edge and the second side edge in the unpacked configuration. Thus, in the unpacked configuration, the length of one of the side edges may be at least twice the length of the other side edge, such as three times the length, four times the length, or even longer.

It should be understood that the shape of the corner sections may change when the membrane is arranged in the packed configuration. As an example, when rolling the membrane to thereby arrange it in the packed configuration, the folds or the contraction may be straightened whereby the length of the first side edge and the second side edge may be substantially identical in the packed configuration.

It should further be understood, that when water unpacks the membrane and moves the float toward the building, the shape of the corner section may change; i.e. from the packed configuration where the length of the first side edge and the second side edge may be substantially identical thereby forming a substantially rectangular shape in a roll to a substantially triangular shape when the membrane is in the unpacked configuration and the float is moved to the corner of the building.

As the length of the first side edge and the second side edge may substantially identical in the packed configuration, a shorter length of one of the first side edge and the second side edge in the unpacked configuration may be denoted "an effective length".

By folding the membrane, more membrane material may be present at corners of the building thereby ensuring sufficient material to protect the building also at the corners.

It should be understood, that folded membrane sections may also be provided to enable protection at vertical corners, such as level difference at ground or at a terrace edge or a balcony edge.

The corner section(s) may comprise a plurality of flexible elements arranged transverse to the membrane and extending from the first side edge to the second side edge. The flexible elements may act as additional floats and may thereby facilitate positioning of the membrane at the corners. As an example, the flexible elements may comprise flex hoses or similar flexible elements.

The flexible elements may form a fan-shape when the membrane is in the unpacked configuration. By fan-shape should be understood, that the flexible elements are not parallel and that the distance between two neighbouring flexible elements increases from one side edge to the opposite side edge.

To facilitate positioning of the membrane at an outer corner, it may be an advantage if the distance between two neighbouring flexible elements increases from first side edge to the second side edge. On the contrary, to facilitate positioning of the membrane at an inner corner of a building, it may be an advantage if the distance between two neighbouring flexible elements increases from second side edge to the first side edge.

To facilitate positioning of the membrane circumferentially around the building the bendable sections of the float may be arranged at least at the corner sections.

The at least one corner section may further comprise an elastic shaping element facilitating adaptation of the membrane to the outer surface of the building at a corner of the building. The elastic shaping element may comprise a rubber band or another suitable elastic element capable to contract at least at part of the membrane at the corner section. The elastic shaping element may in one embodiment be attached to the float, such as to a bendable section of the float.

According to a third aspect, the invention provides a flooding protective device, the flooding protective device comprising a membrane movable between a packed and an unpacked configuration, a float fixed to the membrane along a first side edge, an encapsulation housing the membrane and the float and having an opening and a closure movable relative to the opening between a closed and an open configuration by air pressure, the open configuration allowing movement of the membrane from the packed to the unpacked configuration through the opening, the device further comprising pressure means for establishing the air pressure upon detection of water.

It should be understood, that a skilled person would readily recognise that any feature described in combination with the first and second aspects of the invention could also be combined with the third aspect of the invention, and vice versa.

The flooding protection device according to the third aspect of the invention is very suitable for performing the method steps according to the first aspect and suitable in relation to the flooding protection installation according to the second aspect of the invention. The remarks set forth above in relation to the method and the flooding protection installation are therefore equally applicable in relation to the flooding protective device.

The flooding protective device may further comprise an attachment structure configured to form a joint between a second side edge of the membrane and an inner surface of the encapsulation. The attachment structure may comprise an adhesive, tape, a Snap fit locking where a part of the membrane engages a part of the encapsulation.

In one embodiment, the flooding protective device may further comprise a fixing structure configured to form a fixing between the encapsulation and a ground surface. The fixing structure may as an example comprise a plurality of earth rods.

According to a fourth aspect, the invention provides a method for protecting a building against flooding by use of a membrane connected along a first side edge to a float, the method comprising the steps of arranging the membrane in a packed configuration at a first distance from the building, and fixing the membrane to the ground at a start location along a second side edge, allowing water to unpack the membrane and to move the float toward the building to thereby arrange a first portion of the membrane with a lower surface against ground in an area between the start location and the building, allowing water to raise the float a second distance along an outer surface of the building while further unpacking the membrane to thereby arrange a second portion of the membrane with the lower surface against the building, wherein the float comprises rigid sections connected by bendable sections.

It should be understood, that a skilled person would readily recognise that any feature described in combination with the first, second, and third aspects of the invention could also be combined with the fourth aspect of the invention, and vice versa.

The remarks set forth above in relation to the first, second, and third aspects are therefore equally applicable in relation to the method according to the fourth aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
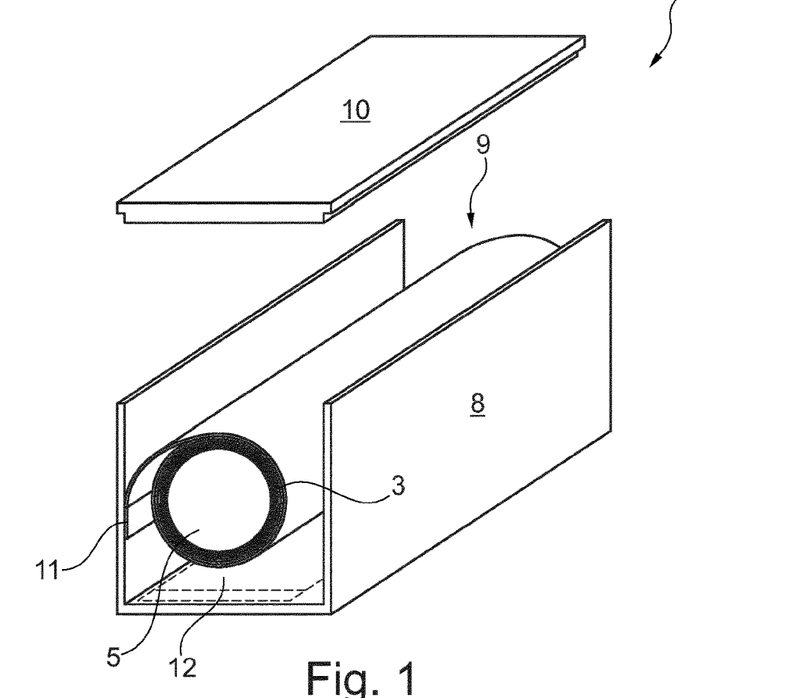
FIG. 1 illustrates an embodiment of a flooding protection installation.
Figure 4:
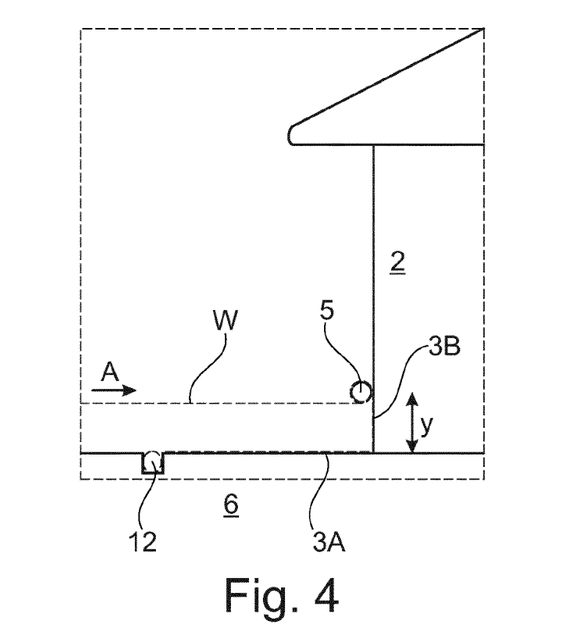
FIG. 4 illustrates a flooding protection installation being unpacked.

FIG. 1 illustrates an embodiment of a flooding protection installation 1 which is configured to protect a building 2 (see e.g. FIG. 4). The installation 1 comprises a membrane 3 connected along a first side edge 4 (see FIG. 7) to a float 5 (see FIG. 7).

The membrane 3 is configured to be arranged in a packed configuration at a first distance X (see FIG. 3) from the building 2. Furthermore, the membrane 3 is configured to be fixed to the ground 6 at a start location S (see e.g. FIG. 3) along a second side edge 7 (see FIG. 7).

Figure 3:
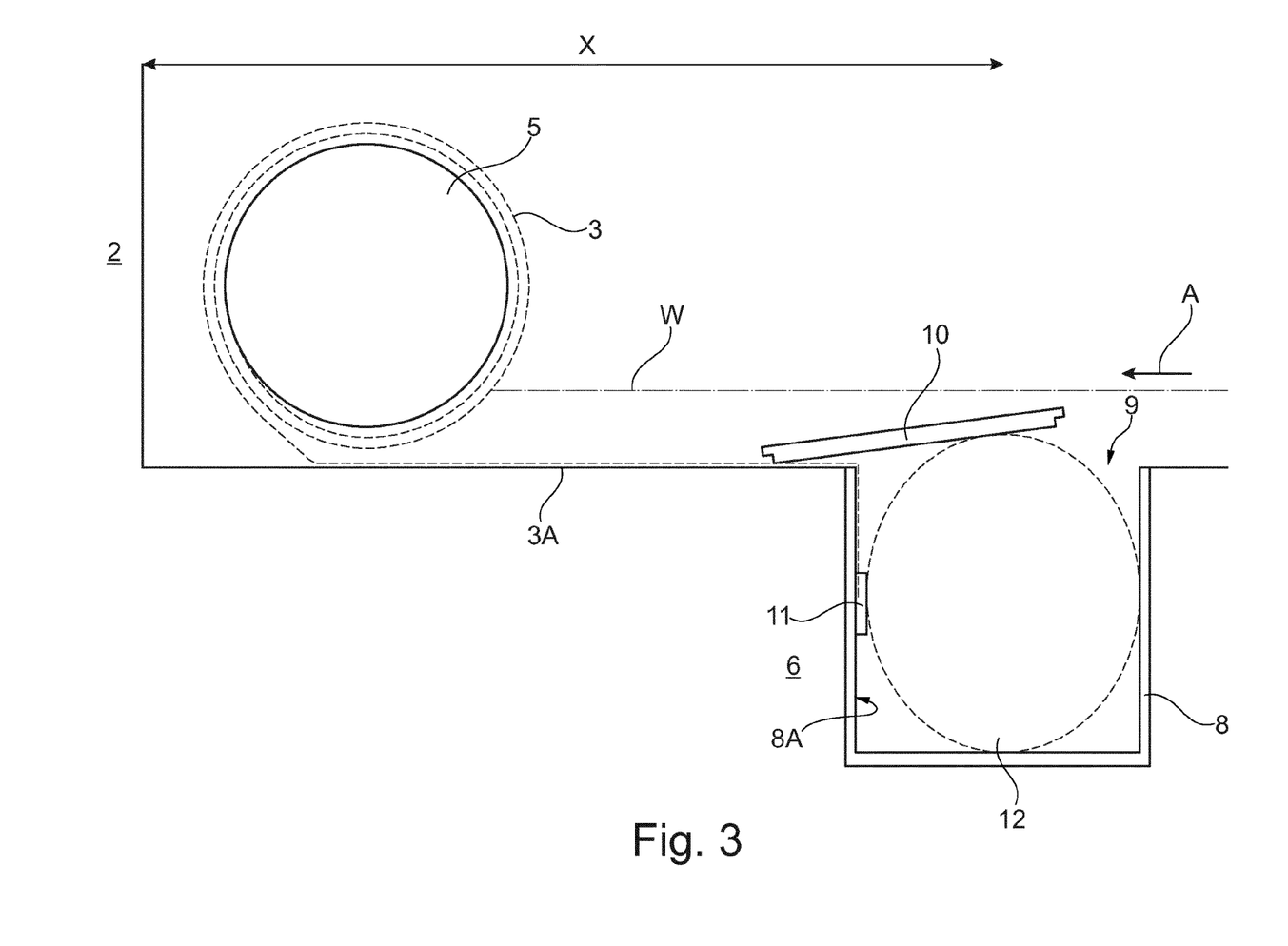
FIG. 3 illustrates a cross-section of a flooding protection installation being unpacked.

The membrane 3 is configured to be unpacked and the float 5 is configured to be moved toward the building 2 by water as indicated by the arrow A in FIG. 3, whereby a first portion 3A of the membrane is configured to be arranged with a lower surface against ground 6 in an area between the start location S and the building 2. The float 5 is further configured to be raised a second distance Y (see FIG. 4) along an outer surface of the building 2 and a second portion 3B of the membrane is configured to be arranged with the lower surface against the building 2.

In FIGS. 3, 4, 5, and 6, an upper water level is illustrated by the dotted line w.

The flooding protection installation 1 further comprises an encapsulation 8 with space for the membrane 3 in the packed configuration and the float. In the illustrated embodiment, the packed configuration defines a configuration in which the membrane 3 is rolled about the float 5.

Figure 5:
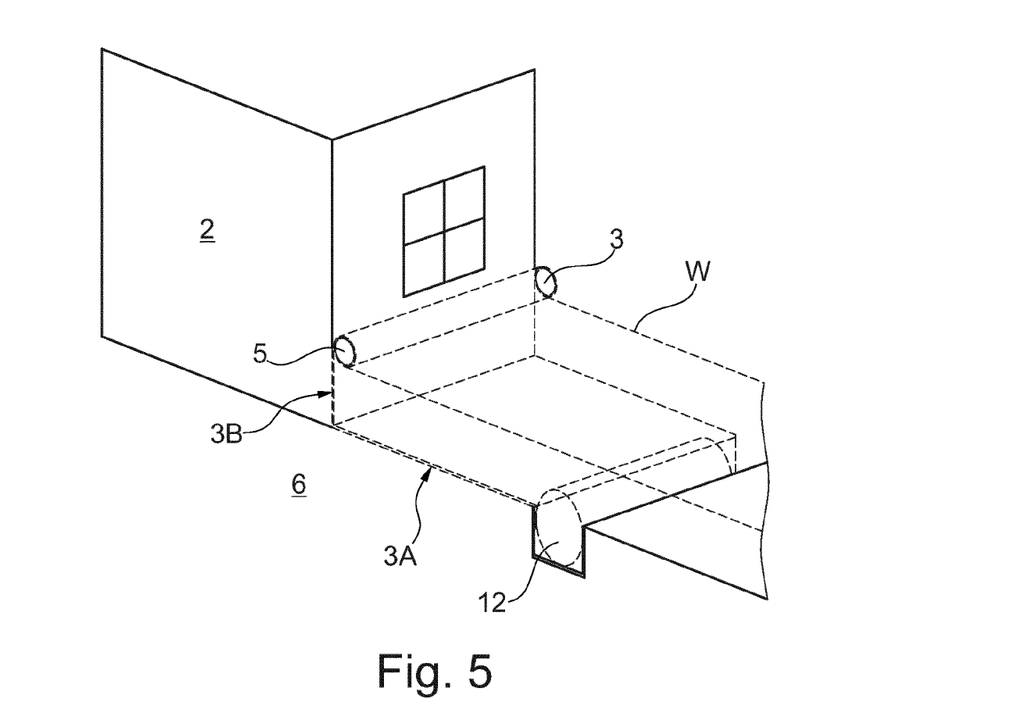
FIG. 5 illustrates another view of a flooding protection installation being unpacked.

As illustrated in FIGS. 3, 4, 5, and 5, the illustrated embodiment of the encapsulation 8 is arranged with an upper side surface substantially at ground level.

The encapsulation 8 has an opening 9 and a closure 10 which is movable relative to the opening 8 between an open and closed configuration. To facilitate unpacking of the membrane 3, the encapsulation 8 is arranged so that the opening 9 is facing upwardly.

The membrane 3 is attached to an inner surface 8A of the encapsulation 8 along the second side edge 7. In the illustrated embodiment, the membrane 3 is attached by use of an adhesive 11.

The flooding protection installation 1 further comprises a release structure 12 configured to release the membrane 3 upon detection of water to thereby enable unpacking. The release structure 12 may comprise a water detection element to provide automatic release.

In the illustrated embodiment, the release structure 12 comprises a tube 12 and pressure means (not shown). Upon detection of water, the pressure means inflates the tube 12 whereby the membrane 3 is lifted out of the encapsulation 8 and is arranged in a position which allows water to unpack the membrane 3 and to move the float 5 toward the building.

The flooding protection installation 1 further comprises a fixing structure (not shown) configured to form a fixing between the encapsulation 8 and a ground surface.

Figure 2:
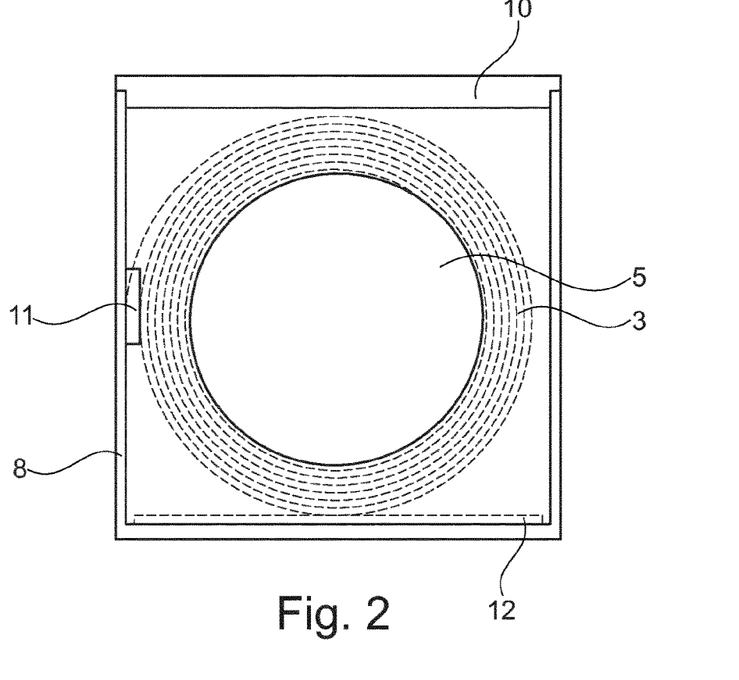
FIG. 2 illustrates a cross-section of a flooding protection installation.

FIG. 2 illustrates a cross-section of a flooding protection installation 1 where the membrane 3 is arranged in a rolled; i.e. packed configuration in the encapsulation 8. The closure 10 is in the closed configuration.

FIG. 3 illustrates a cross-section of a flooding protection installation 1 being unpacked. In the right part of the figure, the closure 10 has been removed by the release structure 12; i.e. the tube 12 has been filled with air to thereby lift the membrane out of the encapsulation 8. In the left part of the figure, the membrane 3 has been lifted out of the encapsulation 8, and water is moving the float 5 toward the building 2, whereby the membrane 3 rolls towards the building so that a first portion 3A of the membrane is arranged with a lower surface against ground 6 in an area between the start location S and the building 2. The first portion 3A thereby forms a retention portion which is retained on the ground by water on the upper surface.

FIGS. 4 and 5 illustrate different views of a flooding protection installation 1 being unpacked. The float 5 is moved toward the building 2 by water as indicated by the arrow A, whereby a first portion 3A of the membrane is arranged with a lower surface against ground 6 in an area between the start location S and the building 2. The float 5 is further raised a second distance Y along the outer surface of the building 2, whereby a second portion 3B of the membrane is arranged with the lower surface against the building 2.

Figure 6:
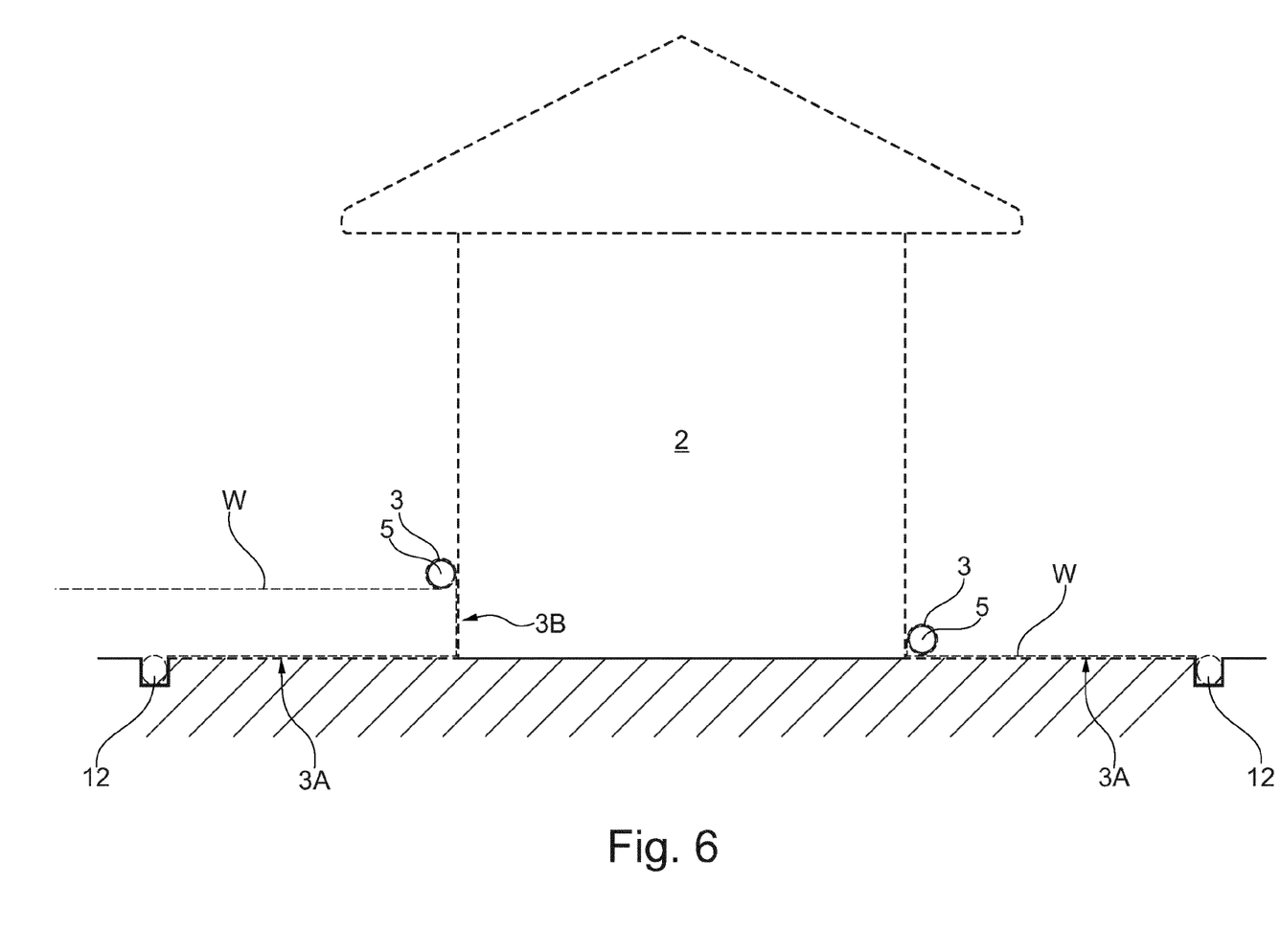
FIG. 6 illustrates a view of a flooding protection installation being unpacked.

FIG. 6 illustrates a flooding protection installation 1 being unpacked where ground level varies around the building 2. A the left side of the building 2, ground level is lower than ground level at the right side of the building 2. At both sides of the building 2, a first portion 3A of the membrane is arranged with a lower surface against ground 6 in an area between the start location S and the building 2. As the rising water determines the height Y to which the float is raised, a second distance Y where a second portion 3B of the membrane is arranged with the lower surface against the building 2 is smaller at the right side of the building than at the left side of the building.

Figure 7:
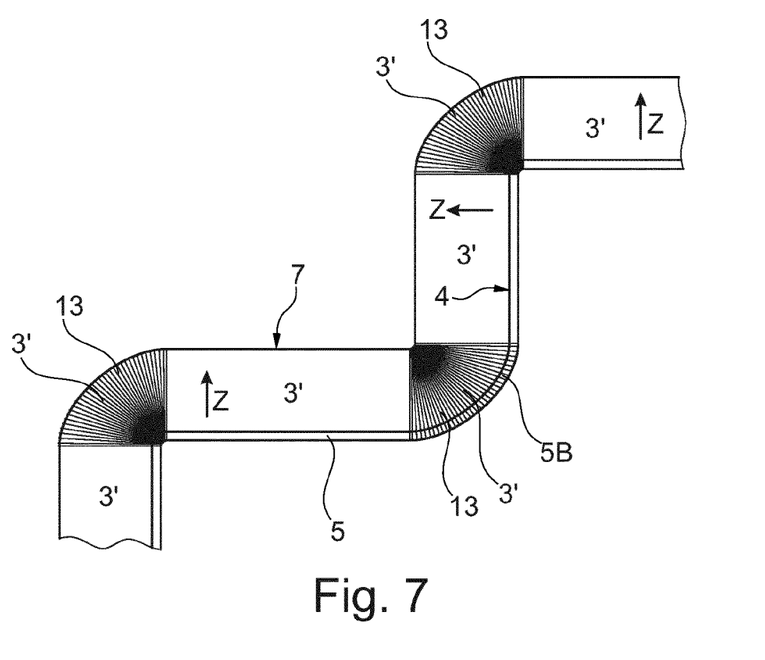
FIG. 7 illustrates details of a flooding protection installation before installation.
Figure 8:
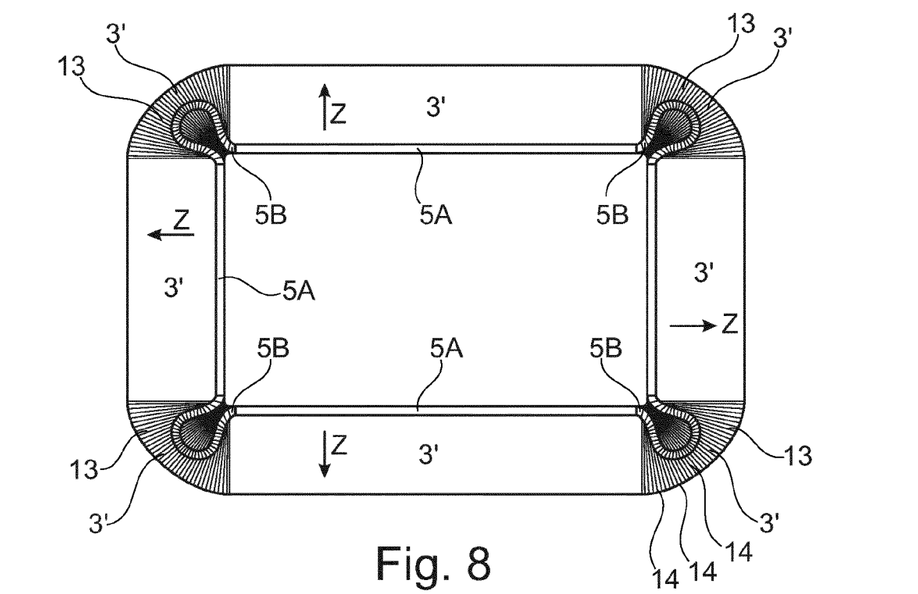
FIG. 8 illustrates a flooding protection installation before installation.

FIG. 7 illustrates details of a flooding protection installation 1 before installation, and FIG. 8 illustrates a flooding protection installation 1 adapted to be arranged circumferentially around a building before installation. The membrane 3 comprises a plurality of membrane sheets 3' being adhesively joined.

The float 5 comprises rigid sections 5A connected by bendable sections 5B. The bendable sections are arranged at the corner sections of the membrane. The membrane 3 is at a first side edge only connected to the rigid sections 5A of the float.

The membrane 3 comprises corner sections 13 configured to be arranged against a corner of the building by the water. As illustrated in FIGS. 7 and 8, the corner sections 13 are substantially triangular when unpacked. The triangular shape facilitates adaptation of the membrane 3 to the shape of the building at corners of the building. In the illustrated embodiment, the triangular shape is obtained by folding parts of the membrane 3. By folding the membrane 3, more membrane material is present at corners of the building thereby ensuring sufficient material to protect the building also at the corners.

As illustrated in FIGS. 7 and 8, the triangular shape at the corners is obtained by a plurality of folds 14 thereby forming a fan-shape when the membrane 3 is in the unpacked configuration.

Thus, the corner sections 13 each comprises a membrane section being substantially rectangular and comprising a plurality of folds 14 to thereby form a substantially triangular shape, where the folds extend in the unpacking direction (being opposite to the direction Z).

I.e. each corner section is substantially triangular when unpacked. As the substantially triangular corner sections 13 are formed by folding the membrane, the folds 14 are not parallel to each other, as the distance between two neighbouring folds 14 increases from one side edge to the opposite side edge. At an outer corner, the distance between two neighbouring folds 14 increases from the first side edge to the second side edge. At an inner corner of a building, the distance between two neighbouring folds 14 increases from second side edge to the first side edge.

In the illustrated embodiment, the corner sections 13 are formed of substantially rectangular membrane sections comprising a plurality of folds 14 to thereby form a substantially triangular shape of each of the corner sections in the unpacked configuration.

The corner sections may comprise a plurality of flexible elongated elements (not shown) arranged transverse to the membrane 3 and extending from the first side edge 4 to the second side edge 7.

When preparing the flooding protection installation, the membrane is arranged in the packed configuration by rolling the membrane 3. The membrane 3 is rolled around the float 5 from the first side edge 4 toward the second side edge 7 in the direction of the arrows Z.

Figure 9:
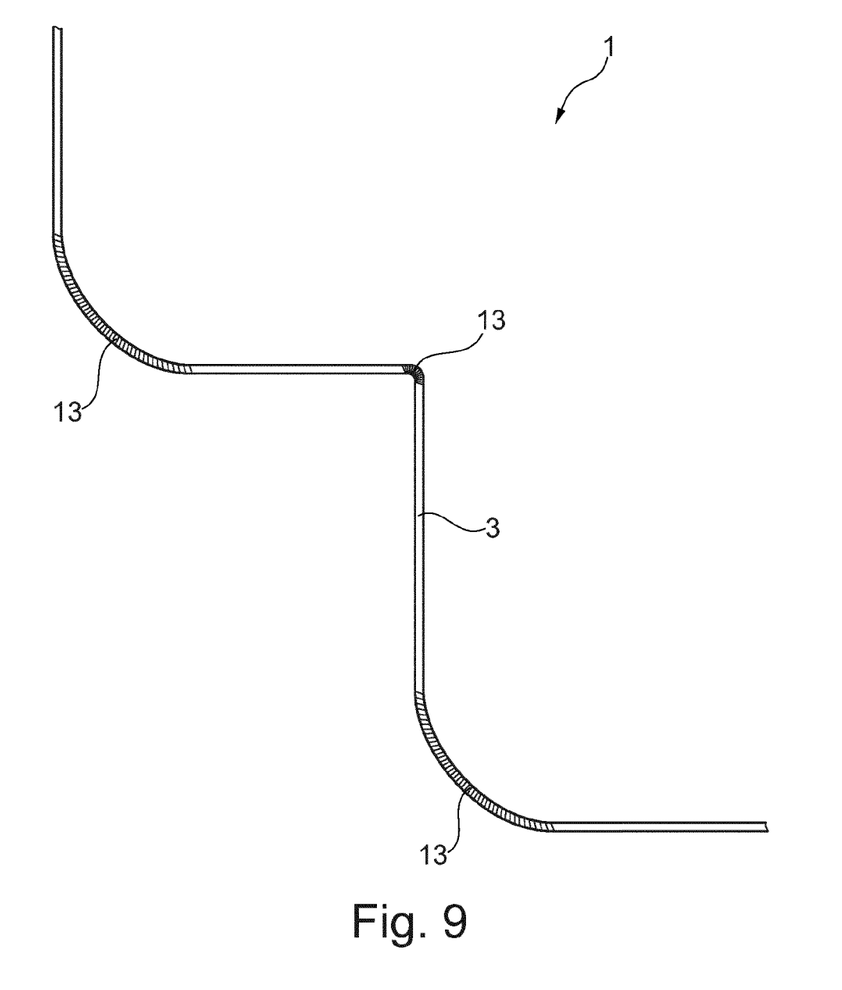
FIG. 9 illustrates details of a flooding protection installation before being unpacked.
Figure 10:
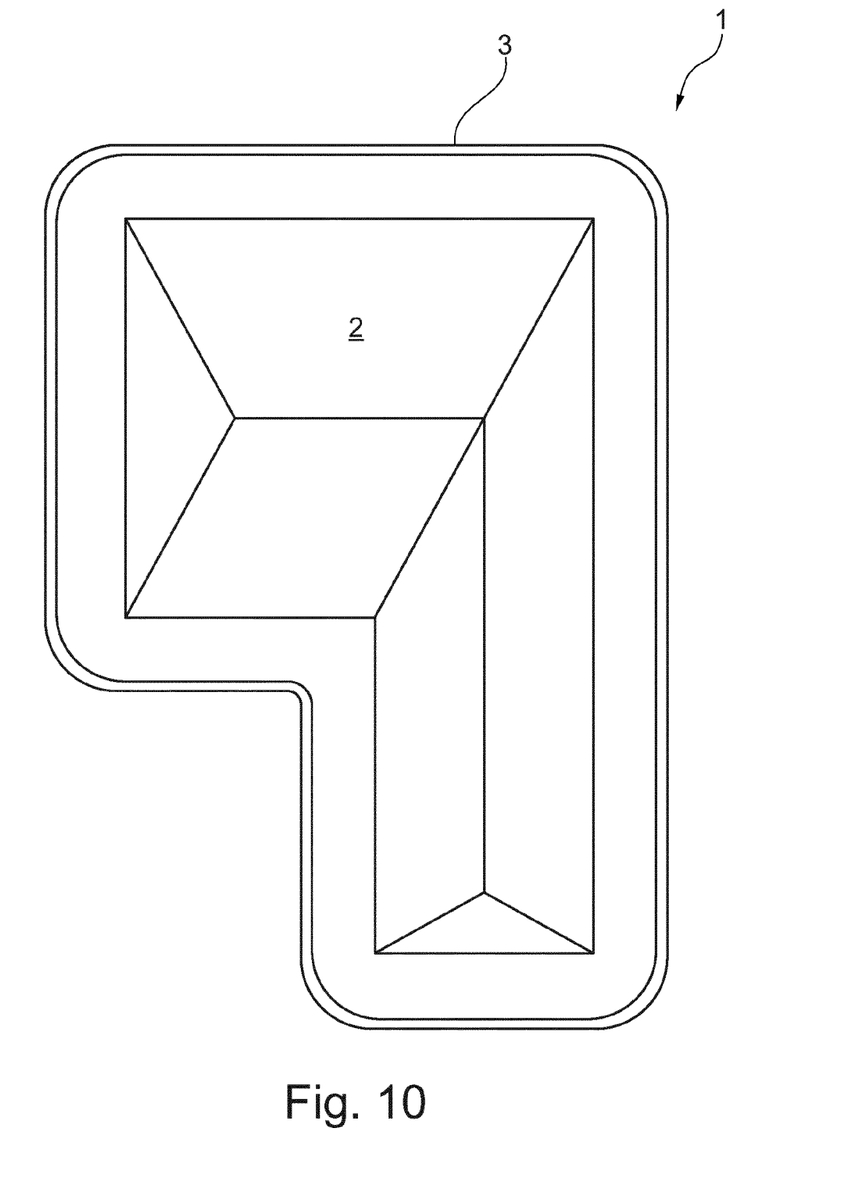
FIG. 10 illustrates a flooding protection installation in a packed configuration.

FIG. 9 illustrates details of a flooding protection installation 1 before being unpacked; i.e. in a packed configuration, and FIG. 10 illustrates a flooding protection installation 1 in a packed configuration where the membrane 3 is rolled around the float 5 from the first side edge 4 toward the second side edge 7 seen from above. It should be understood that the size of the corner sections 13 relative to the membrane 3 is not to scale, but for illustration only.

Figure 11:
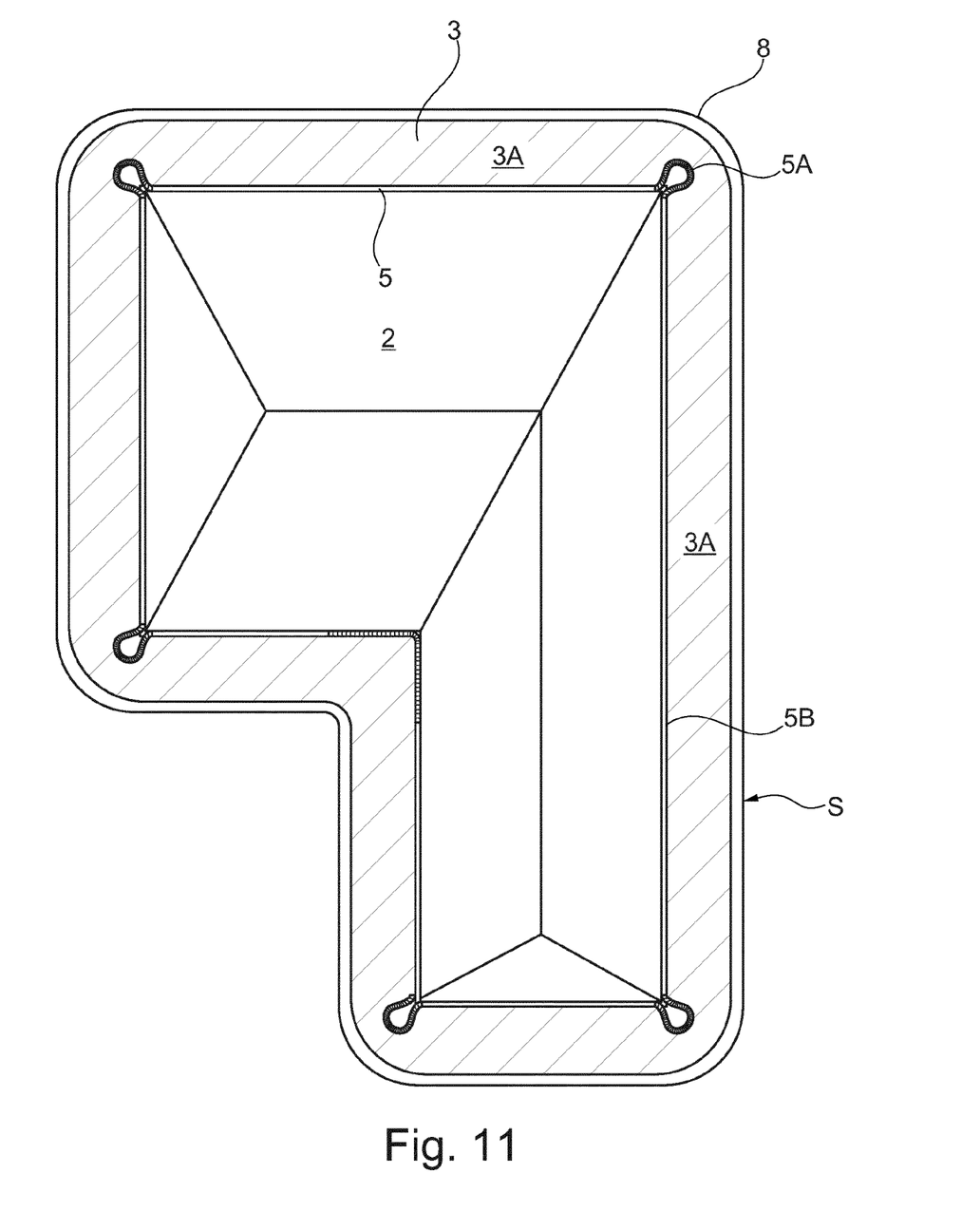
FIG. 11 illustrates a flooding protection installation in an unpacked configuration.

FIG. 11 illustrates a flooding protection installation 1 in an unpacked configuration. The membrane 3 has been lifted out of the encapsulation 8, and the float 5 is moved toward the building 2 by water, whereby a first portion 3A of the membrane is arranged with a lower surface against ground 6 in an area between the start location S and the building 2 with water on the upper side surfaces to retain the membrane at ground.

The float 5 will further rise a second distance Y along the outer surface of the building 2, whereby a second portion 3B of the membrane will be arranged with the lower surface against the building 2.

The invention claimed is:

1. A method for protecting a building against flooding by use of a membrane connected along a first side edge to a float, the method comprising the steps of:
arranging the membrane in a packed configuration where the membrane is rolled about the float at a first distance from the building, and fixing the membrane to the ground at a start location along a second side edge,
allowing water to unpack the membrane by unrolling the membrane and to move the float toward the building to thereby arrange a first portion of the membrane with a lower surface against ground in an area between the start location and the building,
allowing water to raise the float a second distance along an outer surface of the building while further unpacking the membrane to thereby arrange a second portion of the membrane with the lower surface against the building,
wherein the first portion forms a retention portion being retained on the ground by water on an opposite upper surface.

2. The method according to claim 1, wherein the membrane in the packed configuration has a width substantially parallel to the first distance, the first distance being at least 1.5 times the width.

3. The method according to claim 1, wherein the float comprises rigid sections connected by bendable sections.

4. A building with a flooding protection installation for protection of the building, the installation comprising a membrane connected along a first side edge to a float, the membrane being arranged in a packed configuration where the membrane is rolled about the float at a first distance from the building, and being fixed to the ground at a start location along a second side edge,
wherein the membrane is configured to be unpacked by unrolling the membrane, and the float is configured to be moved toward the building by water whereby a first portion of the membrane is configured to be arranged with a lower surface against ground in an area between the start location and the building, and
wherein the float is configured to be raised a second distance along an outer surface of the building and a second portion of the membrane is configured to be arranged with the lower surface against the building,
wherein the first portion forms a retention portion being retained on the ground by water on an opposite upper surface in an unpacked configuration.

5. The building with a flooding protection installation according claim 4, wherein the membrane is arranged circumferential around the building.

6. The building with a flooding protection installation according to claim 4, further comprising an encapsulation with space for the membrane and the float, the encapsulation having an opening and a closure movable relative to the opening between an open and closed configuration.

7. The building with a flooding protection installation according to claim 6, wherein the release structure is further configured to lift the membrane and the float out of the encapsulation upon detection of water.

8. The building with a flooding protection installation according to claim 6, wherein the closure is movable relative to the opening between the closed and the open configuration by air pressure, the open configuration allowing movement of the membrane from the packed to the unpacked configuration through the opening, the device further comprising pressure means for establishing the air pressure upon detection of water.

9. The building with a flooding protection installation according to claim 8, further comprising an attachment structure configured to form a joint between a second side edge of the membrane and an inner surface of the encapsulation.

10. The building with a flooding protection installation according to claim 8, further comprising a fixing structure configured to form a fixing between the encapsulation and a ground surface.

11. The building with a flooding protection installation according to claim 4, further comprising a release structure configured to release the membrane upon detection of water to thereby enable unpacking.

12. The building with a flooding protection installation according to claim 4, wherein the membrane comprises at least one corner section configured to be arranged against a corner of the building by the water.

13. The building with a flooding protection installation according to claim 12, wherein the corner section has a length of one of the first side edge and the second side edge being at least twice the length of the other one of the first side edge and the second side edge in the unpacked configuration.

14. The building with a flooding protection installation according to claim 12, wherein at least one corner section comprises a plurality of folds in the unpacked configuration.

15. The building with a flooding protection installation according to claim 12, wherein at least one corner section is substantially triangular in the unpacked configuration.

16. The building with a flooding protection installation according to claim 12, wherein the corner section comprising a plurality of flexible elements arranged transverse to the membrane and extending from the first side edge to the second side edge.

17. The building with a flooding protection installation according to claim 16, wherein the flexible elements form a fan-shape.

18. The building with a flooding protection installation according to claim 12, wherein the float comprises rigid sections connected by bendable sections, and wherein the bendable sections are arranged at least at the corner sections.

* * * * *

UNITED STATES PATENT AND TRADEMARK OFFICE
CERTIFICATE OF CORRECTION

PATENT NO. : 10,900,248 B2
APPLICATION NO. : 16/494855
DATED : January 26, 2021
INVENTOR(S) : Peter Johannes Hindhede Blyme et al.

It is certified that error appears in the above-identified patent and that said Letters Patent is hereby corrected as shown below:

In the Claims

Column 14
Line 17, Claim 3: change "rigid sections connected by bendable sections." to --sections comprising plastic tubes connected by bendable sections comprising one or more flex hoses, the sections comprising the plastic tubes having less flexibility than the bendable sections comprising the one or more flex hoses.--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*